Feb. 28, 1967     J. TREFIL     3,306,573
REINFORCED SEAT FOR BUTTERFLY VALVE
Filed March 20, 1964
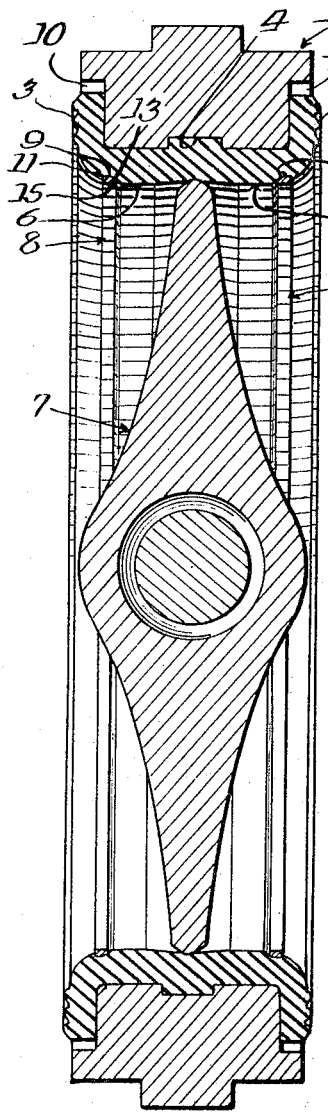
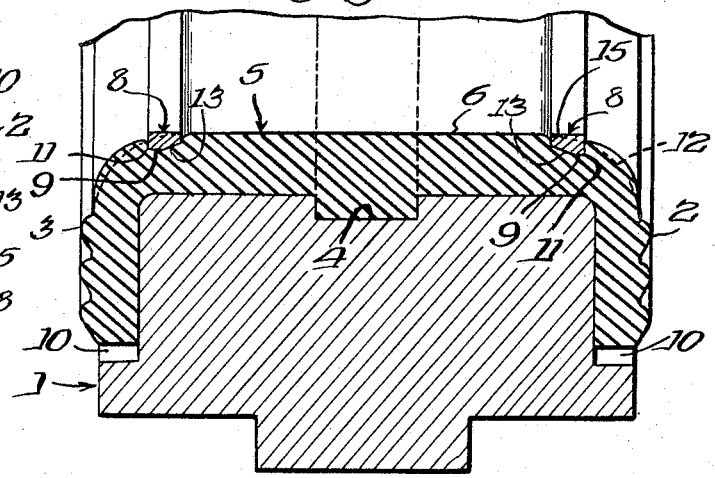
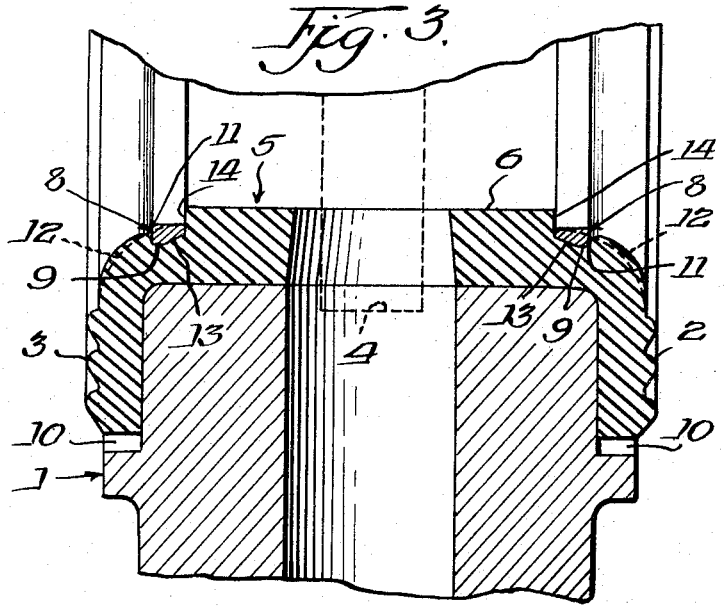
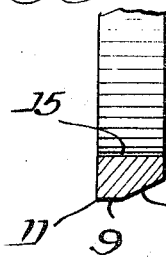
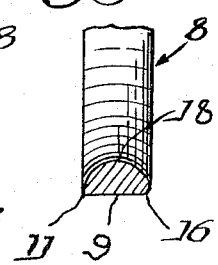
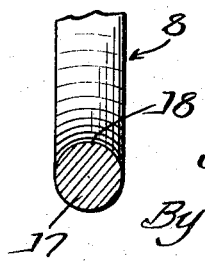
Inventor.
James Trefil.
By Joseph D. Lange
Atty.

United States Patent Office 3,306,573
Patented Feb. 28, 1967

3,306,573
REINFORCED SEAT FOR BUTTERFLY VALVE
James Trefil, Berwyn, Ill., assignor to Crane Co.,
Chicago, Ill., a corporation of Illinois
Filed Mar. 20, 1964, Ser. No. 353,400
6 Claims. (Cl. 251—306)

This invention relates broadly to an improved valve seat for butterfly valves and the like. More particularly, it is concerned with a novel type of replaceable elastomer or rubber-like seat construction for such types of valves especially adapted for more severe service conditions than are usually encountered.

In order to have a better appreciation of the conditions referred to in the preceding paragraph, it should be understood that certain installations in the field require that butterfly valves be made suitable for exposure to higher temperatures and pressures. Specifically, for example, the U.S. Navy has established a requirement for valves of this type intended for use aboard ship embodying a more severe specification and test requirements. This specification, MIL–V–22133–B (Ships) March 20, 1961, requires, for one of the tests, a heat exposure test in an oven so that valve flange metal temperature will rise to 400° F. in less than thirty minutes. The temperature is then maintained in the 400–500° F. range for thirty minutes. Water pressure at 100 p.s.i. is maintained in the valve assembly during the entire heat exposure. These tests are made to insure the ability of the valve and the elastomer seat ring to withstand severe heat for a relatively short time such as might possibly occur during an outbreak of fire aboard ship. Obviously, this test requirement, among others, makes demands upon a butterfly valve, say, in excess of the normal service encountered in the field. It will be realized that if the normal valve seat of a butterfly valve were subjected to the temperatures referred to, the valve seat or liner would be caused to swell and eventually break down, causing valve failure.

It is therefore one of the more important objects of this invention to provide a convenient and economical means for retaining the rubber or elastomer liner or seat to meet such high temperature conditions successfully.

Another important object is to provide for a novel form of retaining ring which holds the liner or valve seat in position regardless of the swelling condition of said seat normally encountered under such severe services.

A further object is to provide for a retainer ring for a valve seat or liner in a butterfly valve body which can be easily applied to valves in stock or already in inventory in the field without the necessity for employing expensive tooling to accomplish such change without disassembly of the valve itself. The latter change thereby avoids the disturbance of the critical relationship between the valve closure member and the valve seat as originally established by the valve manufacturer.

Another object is to provide for a retaining ring which is preferably of such proportions and design as to make it readily adaptable for use when made in a corrosion resisting material, as, for example, Monel, a nickel alloy produced by the International Nickel Company, New York, N.Y.

Another important object is to provide for a simple retaining ring of substantially circular configuration when viewed in plan and preferably of substantially rectangular cross-section, which can be forced into the liner or seat and thus retained by the impingement of an outer annular portion of the ring into the rubber liner or seat upon suitable mounting within the seat.

Another object is to provide for a retaining ring for a butterfly valve seat or the like in which said ring is provided with its outer annular surface suitably tapered, rounded or otherwise formed to provide for easy entrance of the said ring into the valve seat in the normal course of installation.

Another object is to provide for a retaining ring which without departing from the principle of its retention provided may be of a variety of transverse forms in cross-section as hereinafter described.

Another object is to provide for a retainer ring in which the ring employed may be provided with roughened surfaces of circumferential extant which assist in the gripping and retaining functions of the ring.

Other objects and advantages will become more readily apparent upon proceeding with the following description read in light of the accompanying drawings, in which:

FIG. 1 is a transverse sectional assembly view of a butterfly valve seat and closure member in a valve casing in which the seat is provided with the liners of this invention;

FIG. 2 is a magnified fragmentary sectional view of the construction referred to in FIG. 1;

FIG. 3 is a magnified fragmentary sectional view of the construction referred to in FIG. 2, but taken at 90° from the section taken in FIG. 2 and is located at the lower portion of the valve body;

FIG. 4 is a magnified fragmentary sectional view of the ring section shown in FIGS. 1 to 3 inclusive; and FIGS. 5 and 6 are magnified fragmentary sectional views of reinforcing rings modified, but generally embodying the principles of the preferred form.

Similar reference numerals refer to similar parts throughout the several views.

Referring now to FIG. 1, the general sectional view depicted of a butterfly valve refers to what is known in the trade as the renewable type of valve seat as distinguished from the molded-in seat ring. The valve body generally designated 1 is of a length to permit of its insertion between flanges (not shown) and by means of which the seat ring at 2 and 3 is clamped between said flanges, the ring preferably being of a composition, such as an elastomer or rubber and the like. At a central portion of the body 1, an annular recess 4 is provided to receive a similar snug seating annular rib on the valve seat generally designated 5, received within the recess 10 of the body 1. The inner ported portion 6 thus forms an annular seating surface for the rotatable closure member 7 of the valve to make the contact as indicated in the closed position as shown more clearly in FIG. 1.

It should now be understood that when the butterfly valve is exposed to the severe service conditions referred to above, the seating surface 6 frequently has swelled and thereby expanded inwardly as well as outwardly relative to the valve central axis, causing such objectionable deformation as to seriously impair the satisfactory operation of the valve.

It has been discovered that if a retaining or reinforcing ring generally designated 8 having an outside diameter at 9 slightly larger than the peripheral diameter of the seating surface 6, as shown, is forced inwardly, that is, toward the closure member, a beneficial retention of the seat is obtained. An annular sharp corner or edge is formed at 11 so that the ring 8 will impinge annularly and imbed itself in a relatively shallow manner within the valve seating surface 6 to such extent as not only to securely hold it positively against release from the seat ring 5 outwardly during service, but also to support that area of the ported seat 6 disposed between the oppositely disposed rings 8. This reinforcement effectively aids in maintaining the desired fluid-tight seat contact peripherally between the closure member 7 and the said seating surface 6 of the seat ring 5.

As illustrated in FIGS. 2 and 3, the degree of impingement between the retaining rings 8 and the seat ring 5 is shown more graphically by the change represented by the dotted lines indicated at 12. The latter lines show the actual shape of the seat ring 5 before the retaining rings 8 have been forced into the position illustrated. It should also be noted that in the preferred forms shown in FIGS. 1 to 4 inclusive, the retaining rings 8 are annularly tapered as indicated at 13, thereby assisting in the sliding movement of the retaining rings inwardly during the course of their final assembled position shown in said figures. The tapered edge 13 may be formed rounded instead of being sharp as shown as hereinafter described in detail. The degree of such insertion of the retaining rings 8 transversely within the seat member 5 is limited by the shoulders formed at opposite ends of the trunnion portion of the seat ring as indicated at 14 in FIG. 3. It will be understood that this insertion depends upon the size and shape of the seat ring and the reinforcement desired. Preferably, the inner annular surface portion 15 should be of such diameter as not to project inwardly beyond the annular seating surface 6 to avoid interference with the fluid flow, nor serve as the means for trapping sedimentary deposits within the flow line during the normal course of service.

It will be appreciated that while emphasis has been placed on a description of the structural details of the retaining rings 8 shown in FIGS. 1 to 4 inclusive, it will, of course, be apparent that again depending upon service conditions and the form of seat to be employed for the butterfly valve, the cross-sectional form of the retaining rings generally designated 8 may vary somewhat from that shown in FIGS. 1 to 4 inclusive.

In this connection, attention is now directed to the modified retaining ring 8 of FIG. 5 in which the outer periphery thereof is indicated at 9 and wherein the inner periphery is of substantially semi-circular, cross-sectional configuration adapted to be positioned in port 18. Here, similarly, the latter surface portion and the radius of the semi-circular ring is made of such dimensions so as preferably not to project inwardly beyond the annular seating surface 6 of the seat ring 5. It should also be understood that the rounded annular surface 16 aids in positioning the ring 8 within the seat 5 in the same manner as described in connection with FIGS. 1 through 4 inclusive. Further, said surface 16 thus functions in the manner of the tapered annular surface 13 of the previously described figures. In all cases, the sharp annular corner 11 provides for the bite of the ring 8 into the seat 5.

A still further modification, as shown in FIG. 6, may be employed in which the retaining ring 8 when viewed in cross-section is of circular configuration as indicated at 17, but in which preferably all of the surface as indicated at 18 here defining the circular cross-section are slightly roughened, knurled, serrated, ribbed, or otherwise formed to provide for suitable gripping between the retainer ring 8 and the seat 5.

All of the rings whether in the preferred form shown in FIGS. 1 to 4 inclusive or with the modifications shown in FIGS. 5 and 6 may be positioned with a suitable tool annularly applied to the inner portion of the ring and exerting an axial force in a direction toward the center of the valve seat 5. It will be understood that while certain embodiments of the invention have been illustrated and described, other forms may be employed. Therefore, the invention should be construed in accordance with the claims hereinafter following interpreted in light of the art of record.

I claim:
1. A reinforcing metallic retaining ring for a butterfly valve seat or the like, the combination of an annular elastomer seat, the said ring being of substantially semi-circular configuration in cross-section, an inner annular portion of the said seat receiving said ring, the latter being formed with an inner annular rounded corner portion and with an outer annular sharp corner portion whereby to enable said ring to imbed itself within the ported portion of the said seat upon predetermined movement of said ring inwardly relative to the said seat.

2. A reinforcing metallic retaining ring for a butterfly valve seat or the like, the combination of an annular elastomer seat therefor, the said ring being of substantially semi-circular cross-section, an inner annular portion of the said seat receiving said ring, the latter being formed with an inner substantially frusto-conical surface on its outer periphery and with an outer annular sharp corner portion whereby to enable said ring to imbed itself within the inner annular portion of the said seat upon moving said ring transversely inwardly relative to the said seat.

3. In a butterfly valve, the combination including: a valve body; an annular seat with trunnion portions and transverse size extensions straddling a portion of the said valve body; an inner annular portion on said seat member adjacent each of said extensions receiving a retaining ring; an endless, rigid, reinforcing retaining ring positioned in each said annular portion, said ring having means on its outer periphery to retain said ring within and in contact with said annular portion upon predetermined inward axial movement of said ring relative to said seat, said ring further being located such that its outer peripheral dimension is less than the minimum inner peripheral dimension of the said valve body.

4. The subject matter of claim 3 wherein the inner periphery of said ring is substantially smooth and wherein its outer periphery is substantially frusto-conical and wherein said means to retain said ring includes; an annular sharp corner on said outer periphery adapted to imbed itself within said inner annular portion upon said predetermined movement relative to said seat whereby said ring is adapted to be axially guided into position.

5. The subject matter of claim 3 wherein said ring is substantially circular in cross section and wherein said means includes a roughened portion on the inner periphery of said ring.

6. The subject matter of claim 3 wherein said ring includes a substantially semi-circular inner configuration and wherein said outer periphery is formed having an annular rounded corner portion and wherein said means comprises an annular sharp corner portion whereby to enable said ring to imbed itself within said annular portion upon predetermined movement relative to said seat.

References Cited by the Examiner

UNITED STATES PATENTS 3,079,123   2/1963   Freemantle _____ 251—306
3,173,650   3/1965   Cotterman et al. _____ 251—306

FOREIGN PATENTS 1,130,544   10/1956   France.

M. CARY NELSON, *Primary Examiner.*

R. C. MILLER, *Assistant Examiner.*